US012176904B2

(12) United States Patent
Guruprasad et al.

(10) Patent No.: US 12,176,904 B2
(45) Date of Patent: Dec. 24, 2024

(54) ALARM SYSTEMS AND CIRCUITS (71) Applicant: Arm Limited, Cambridge (GB)

(72) Inventors: Shashank Guruprasad, Bangalore (IN); Roma Rudra, Bangalore (IN); Mikael Yves Marie Rien, Bernin (FR); Karthik Sankaranarayanan, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/501,642

(22) Filed: Oct. 14, 2021

(65) Prior Publication Data
US 2023/0124622 A1    Apr. 20, 2023

(51) Int. Cl.
H03K 3/027    (2006.01)
G06F 21/75    (2013.01)
G06F 21/86    (2013.01)
H03K 3/023    (2006.01)
H03K 5/00     (2006.01)
H03K 19/21    (2006.01)

(52) U.S. Cl.
CPC ............ H03K 3/027 (2013.01); H03K 3/023 (2013.01); H03K 5/00006 (2013.01); H03K 19/21 (2013.01); *G06F 21/75* (2013.01); *G06F 21/86* (2013.01); *H03K 2005/00241* (2013.01)

(58) Field of Classification Search
CPC .... H03K 3/027; H03K 3/023; H03K 5/00006; H03K 19/21; H03K 2005/00241
See application file for complete search history.

(56) References Cited

U.S. PATENT DOCUMENTS

| 5,486,201 A * | 1/1996 | Canfield ................. A61N 1/37 607/13 |
| 5,727,034 A * | 3/1998 | Ojaniemi ............. H04J 3/0688 375/376 |
| 5,923,193 A * | 7/1999 | Bloch .................. H04L 7/0045 327/144 |
| 9,323,957 B2 * | 4/2016 | A/L Krishnasamy ... G09C 1/00 |
| 9,514,841 B1 * | 12/2016 | Christensen ........ G11C 11/4078 |
| 10,651,863 B1 * | 5/2020 | Rangachari ............ G06F 7/582 |
| 2008/0201395 A1 * | 8/2008 | Luzzi .................... H04L 9/0662 708/255 |
| 2009/0077669 A1 * | 3/2009 | Buer .................... H01L 23/576 726/26 |
| 2013/0187685 A1 * | 7/2013 | Hong ....................... H03L 7/00 327/115 |

(Continued)

FOREIGN PATENT DOCUMENTS

| CN | 1551063 A * | 12/2004 | ........... G09G 3/3648 |
| CN | 111694545 A * | 9/2020 | ............. G06F 7/584 |

(Continued)

*Primary Examiner* — Lincoln D Donovan
*Assistant Examiner* — James G Yeaman
(74) *Attorney, Agent, or Firm* — Pramudji Law Group PLLC; Ari Pramudji (57) ABSTRACT According to one implementation of the present disclosure, a circuit includes: two or more metal wires, respective XOR gates coupled to each of the two or more top metal wires, a shift register having outputs coupled to the XOR gates, an OR gate configured to receive each of the outputs of the XOR gates, and a latch configured to receive an output of the OR gate and transmit an output signal corresponding to an alarm signal.

19 Claims, 9 Drawing Sheets

(56) References Cited

U.S. PATENT DOCUMENTS

| | | | | |
|---|---|---|---|---|
| 2017/0134175 A1* | 5/2017 | Skudlarek | ............ | H04L 9/3278 |
| 2019/0165676 A1* | 5/2019 | Nogawa | ................ | H02M 3/158 |
| 2019/0200454 A1* | 6/2019 | Liu | ........................ | H01L 28/10 |
| 2020/0141767 A1* | 5/2020 | Ou-Yang | ............ | G01D 5/34792 |
| 2021/0063487 A1* | 3/2021 | Fujiwara | ............. | G06F 9/30196 |
| 2021/0104289 A1* | 4/2021 | Yang | ...................... | H03K 19/21 |

FOREIGN PATENT DOCUMENTS

| | | | | | |
|---|---|---|---|---|---|
| CN | 211878594 U | * | 11/2020 | ............ | G06F 21/75 |
| CN | 211878595 U | * | 11/2020 | | |
| CN | 107113254 B | * | 12/2020 | ............ | H04L 45/60 |
| DE | 4422797 A1 | * | 4/1995 | ........... | G11B 33/121 |
| DE | 10319585 B4 | * | 8/2005 | ............ | G06F 21/75 |
| EP | 1372103 A1 | * | 12/2003 | ........... | G06K 7/0008 |
| ES | 2663701 T3 | * | 4/2018 | ........ | G06F 12/0862 |
| GB | 2068675 A | * | 8/1981 | ............ | G09B 5/065 |
| GB | 2182789 A | * | 5/1987 | ....... | G06F 17/30982 |
| JP | H0595386 A | * | 8/1991 | | |
| JP | H04220575 A | * | 8/1992 | | |
| JP | H05260287 A | * | 10/1993 | | |
| JP | 6121785 B2 | * | 4/2017 | ........... | G06F 21/558 |
| JP | 2019139410 A | * | 8/2019 | | |
| KR | 20090114773 A | * | 11/2009 | | |
| RU | 2009125412 A | * | 1/2011 | | |
| WO | WO-9736398 A1 | * | 10/1997 | ............ | G06F 1/3203 |
| WO | WO-2021087417 A1 | * | 5/2021 | ............. | G06F 21/76 |

* cited by examiner

ALARM SYSTEMS AND CIRCUITS

I. FIELD

The present disclosure is generally related to circuits and methods for alarm systems.

II. DESCRIPTION OF RELATED ART

Advances in technology have resulted in smaller and more powerful computing devices. For example, a variety of personal computing devices, including wireless telephones, such as mobile and smart phones, gaming consoles, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities. For such devices, there is an ever-increasing demand for greater security of sensitive, confidential, and valuable data/intellectual property, and greater performance, power, and area efficiency for security measures of such data and intellectual property.

In certain instances, tamper attacks can occur where an attacker may reach through a metal layer to a focused ion beam (FIB) access of inner nodes to reach confidential data. Hence, there is a need in the art for detection systems of any such breach.

III. BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, circuits or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

IV. DETAILED DESCRIPTION

Particular implementations of the present disclosure are described below with reference to the drawings. In the description, common features are designated by common reference numbers throughout the drawings.

According to one implementation of the present disclosure, a circuit includes: two or more metal wires, respective XOR gates coupled to each of the two or more top metal wires, a shift register having outputs coupled to AND gates (where each of the respective AND gates is coupled to the XOR gates), an OR gate configured to receive each of the outputs of the XOR gates, and a latch configured to receive an output of the OR gate and transmit an output signal corresponding to an alarm signal.

According to one implementation of the present disclosure, a system includes: a shift register and comparator block configured to receive an enable or disable signal, two or more seed bit values, and a clock signal, and output an alarm signal.

According to one implementation of the present disclosure, a method to generate a unique seed for a shift register includes: providing a one-time programmable (OTP) per-chip value; providing a boot counter; and generating a seed value based on a combination of the per-chip value and the boot counter.

Advantageously, inventive aspects of the present invention allows for the protection against tamper attacks by providing a metal shield system (i.e., metal wires, shield wires, tamper detection circuit) with alarm features around sensitive and secure circuit design (e.g., shield wires routed on a metal layer above sensitive route signals of the secure intellectual property (IP)). In certain schemes and techniques, as described herein, the inventive methods and circuits provide for the active monitoring of the connectivity of such metal shield wires, detection of a "break" in such connectivity, and the generation of an alarm upon such detection.

In inventive aspects, as the shield system runs around the sensitive IP, for any cut through metal layers to access information would inevitably also cut through at least one of the wires of the shield system. If and when that occurs, an alarm would be raised. Accordingly, through inventive aspects, different signal pulses may be transmitted through the shield wires and would be compared back to an original value. In certain implementations, the shield wires may be driven by a 16-bit linear feedback shift register (LFSR) to provide "randomness" such that the shield wires would hold different as well as random values at any given time. Advantageously, such implementations would increase the difficulty for an attacker to bypass the inventive shield.

Figure 3:
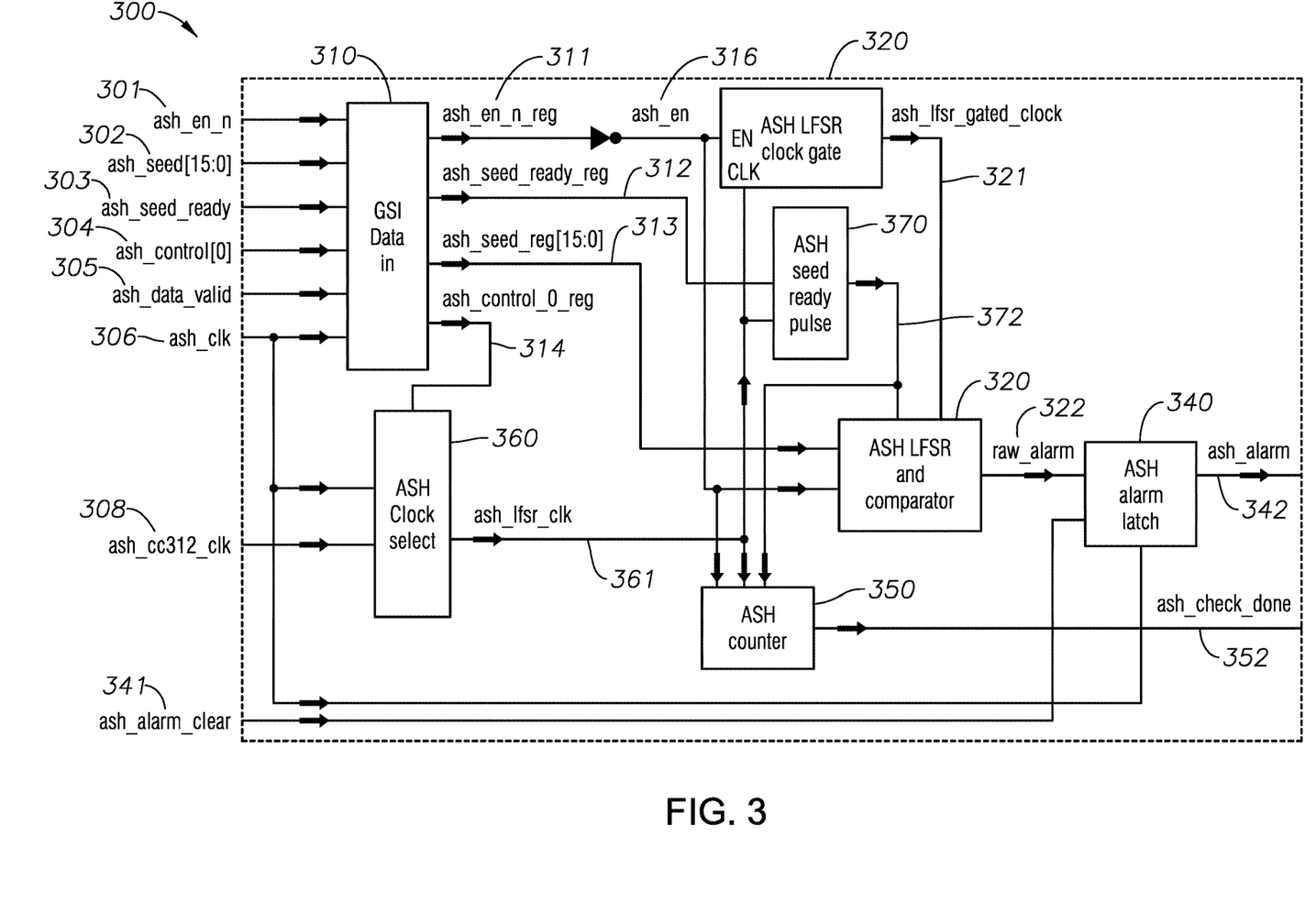
FIG. 3 is a schematic diagram of an example circuit in accordance with various implementations described herein.

In one operation, each wire of the shield may be "driven" by a respective LFSR, where the value of each the wires at reception (RX) would be compared to the original reference signal, the value of the same wire at transmission (TX). Subsequently, the results of the comparison (i.e., the resultant signal) form all the shield wires are combined and registered to eliminate any glitches caused by prorogation delays. The resultant signal may then be latched to create a continuous alarm signal (until such an alarm signal is cleared). For example, during a compare mismatch, an alarm would be generated due to XOR gates. Also, as there can be glitches due to the shield system routing, a delay through the shield can at times be greater than a reference signal (TX). As such, through registers, setup and hold timing checks can ensure that all glitches are filtered out. Also, if there is an alarm (e.g., output signal 152 in FIG. 1, 342 in FIG. 3 is "high" or a digital "1") at the output of the alarm latch (i.e., alarm register) (e.g., 150, 320), the alarm detection would be valid.

Advantageously, in a particular example utilizing a 16-bit LFSR, any cut in the metal wires would be detected within 16 clock cycles (as all registers in the LFSR would have toggled at least once). In another feature, a "check-done" signal would be generated when the alarm signal is "low" (e.g., a digital "0") indicating that no attack has been detected. Advantageously, in one aspect, as the transmitted bits are sent through one or more pseudo-random LFSRs, an attacker may not easily bypass the inventive shield due to the randomness of the bits. Further, if the one or more LFSRs are 16-bit, each of the transmitted bits may be different as well as random at any given time.

Moreover, inventive aspects of the present invention provide for both area and power optimization features. As an example, the area optimization feature includes the capacity for a single LFSR to drive multiple shield wires, thereby reducing the number of LFSRs needed to physically cover a specific region. As an example, the power optimization feature includes a control signal that can disable the system through a clock gate such that the shield system can run only when needed.

Figure 1:
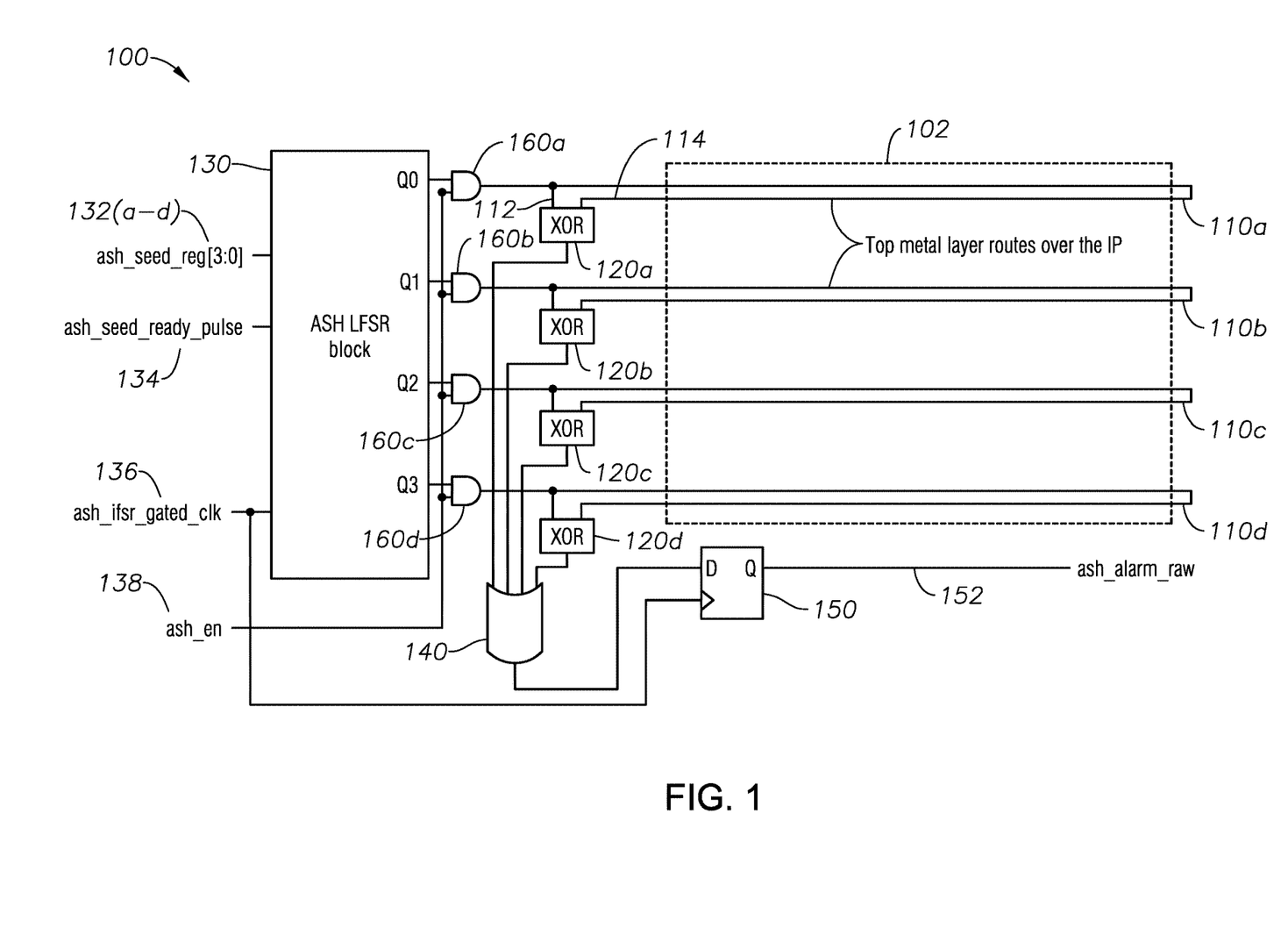
FIG. 1 is a schematic diagram of a portion of an example circuit in accordance with various implementations described herein.

Referring to FIG. 1, an example portion of a tamper detection circuit 100 (e.g., memory circuitry, metal shield system) is shown. As illustrated, the circuit 100 may include at least two or more metal wires 110 (i.e., shield wires) (e.g., 110a-d, 110a-o (e.g., in a 16-bit LFSR implementation)), respective XOR gates 120 (i.e., XOR compares) (e.g., 120a-d, 120a-o (e.g., in a 16-bit LFSR implementation)), a shift register 130 (e.g., a 4-bit LFSR, 16-bit LFSR, two or more shift LFSR registers), an OR gate 140, and a latch 150. In certain implementations, the XOR gates 120 may be coupled to each of the two or more metal wires 110. The shift register 120 can include outputs coupled to AND gates 160 (e.g., 160a-d, 160a-o (e.g., in a 16-bit LFSR implementation)), where each of the respective AND gates 160 may be coupled to the XOR gates 120. Also, the OR gate 140 may be configured to receive each of the XOR gates 120, and the latch 150 may be configured to receive an output of the OR gate 140 and transmit an output signal corresponding to an alarm signal.

In certain cases, the two or more metal wires 110 can include top metal layers (e.g., M6 to M8 metal layers). In certain examples, the two or more metal wires 110 may be configured around (e.g., in a metal layer above) one or more circuit devices 102 (e.g., sensitive intellectual property, sensitive region). In such instances, the two or more metal wires 110 can be routed along a metal layer (e.g., M6 metal layer) and positioned to cover (i.e., overlay) one or more metal wirings (i.e., sensitive signal routing/wiring) (not shown) of the one or more circuit devices 102.

In certain implementations, the shift register 130 may include a linear feedback shift register (i.e., LFSR) (e.g., LFSR shift register, an ASH LFSR block). As illustrated in FIG. 1, in certain instances, the LFSR 130 may include at least a two-bit register (e.g., two-bit, four-bit, 8-bit, 16-bit, 32-bit, 64-bit etc.). Moreover, in some implementations, the LFSR 130 of the tamper detection circuit 100 may include one or more shift registers (e.g., one or more LFSR circuits, a plurality of LFSR circuits 130) to provide protection for a complete semiconductor chip or sensitive layout region.

Figure 4:
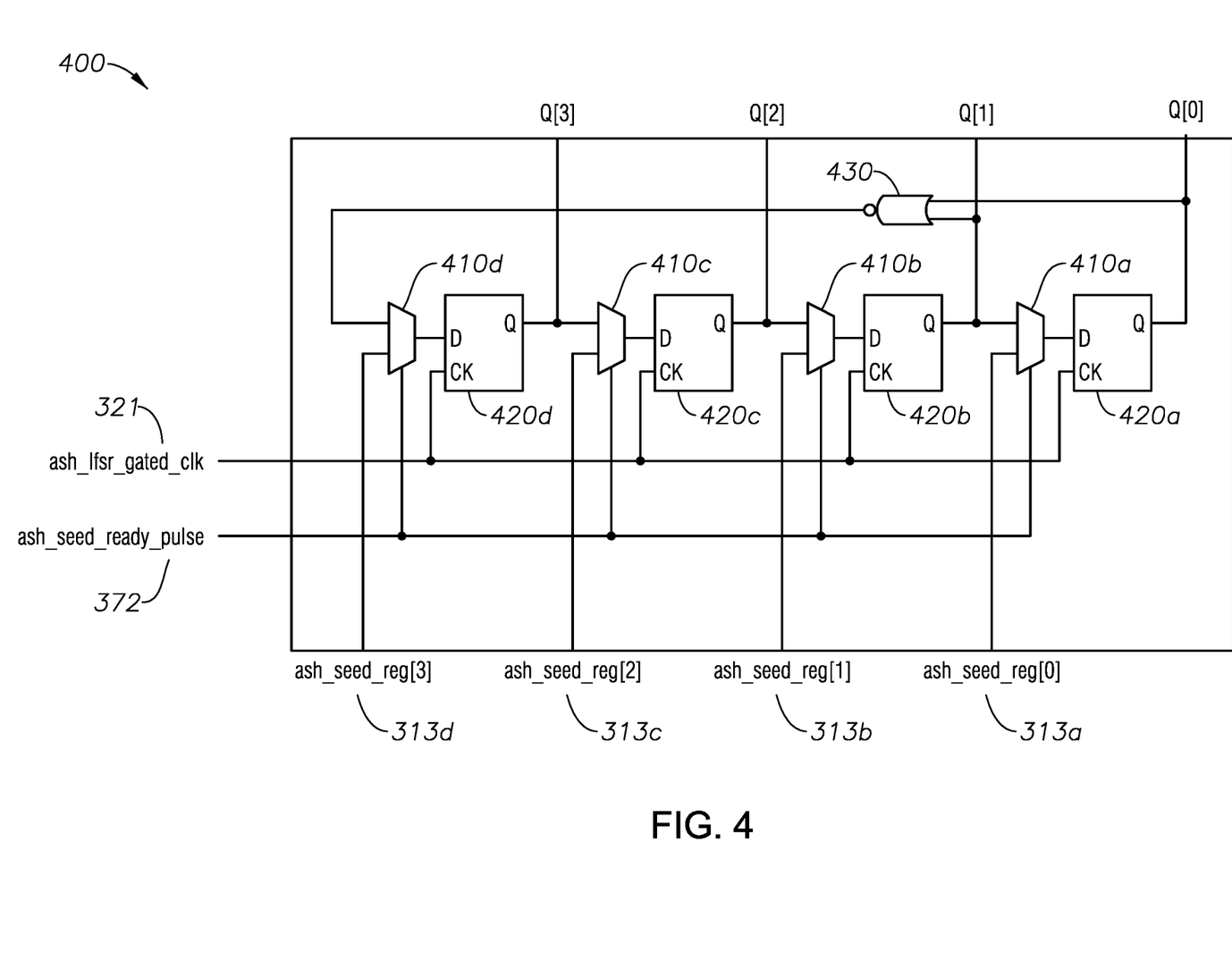
FIG. 4 is a schematic diagram of a portion of an example circuit in accordance with various implementations described herein.

In certain operations, the LFSR 130 may be configured to drive respective signals of the two or more metal wires 110. As illustrated, the LFSR 130 can include three input signals: 1) separate "seed" input signals (ash_seed_reg[3:0] (i.e., two or more seed signals) (e.g., for a 4-bit LFSR) (e.g., ash_seed_reg[15:0] for a 16-bit register)) 132 (e.g., 132a-d, 132a-o); 2) a seed ready signal (ash_seed_ready_pulse) 134; and 3) an input clock signal (ash_lsfr_gated_clk) 136.

Based on the input signals, the LFSR 130 can output separate bits/signals Q0-Q3 (e.g., for a 4-bit LFSR) (e.g., Q0-15 for a 16-bit register) to the respective AND gates 160 (i.e., 160a-160d). Also, input to each of the AND gates 160 is the active shield system enable signal (ash_en) 138 (that is "high" (e.g., a digital "1") in operation), In turn, from each of the respective AND gates 160, respective reference signals (TX) for the circuit 100 are provided. (The LFSR 130 is described in greater detail with reference to FIG. 4).

In various implementations, the enable signal 138 may either enable or disable the shift register 130. As the shift register 130 also receives the gated clock signal 136, the enable signal 138 may be configured to either allow or disallow toggling of the gated clock signal 136. For example, as the shift register 130 can be a LFSR, the current state of each of the outputs Q0-Q15 in a first cycle (e.g., for a 16-bit register) would depend on a prior state of each of the outputs Q0-Q15 in a preceding cycle, while the next state of the each of the outputs Q0-Q15 in a second cycle (e.g., for a 16-bit register) would depend the current state of each of the outputs Q0-Q15 of the first cycle. Accordingly, upon initialization of the system 100, the next state would be a function of a reset value.

In certain examples, initially, prior to operation of the system 100, the seed input signals 132 (e.g., 132a-o) may be pseudo-randomly loaded to any 16 bit value (e.g., for a 16-bit register) to start operation. In certain cases, the seed ready signal 134 may be an acknowledgement signal for each particular seed to verify that a seed input is from the 16 bits (e.g., for a 16-bit register), and therefore, is valid and can be utilized.

In an operation, the respective XOR gates 120 can be configured to compare respective first digital bits (e.g., first values, original reference signals) at first portions (TX, transmission) 112 of the two or more wires 110 to respective second digital bits (e.g., second values) at second portions (RX, reception) 114 of the two or more wires 110. For instance, if a first bit is unequal to a second bit, an alarm (e.g., ash_alarm raw) 152 would ultimately be provided from the circuit 100. As illustrated, in certain operations, the OR gate 140 is configured to combine the outputs of the respective XOR gates 120.

In some operations, the latch 150 is configured to store data corresponding to the output of the OR gate 140 and generate a continuous signal corresponding to an alarm signal. Moreover, the latch 150 can also be configured to remove one or more errors caused by one or more propagation delays. For example, the latch 150, through regular setup and hold checks, can ensure that errors caused by propagation delays are filtered. From the latch 150, the alarm signal 152 may be processed (e.g., either cleared during testing or output as a detection of an attack).

Figure 2A:
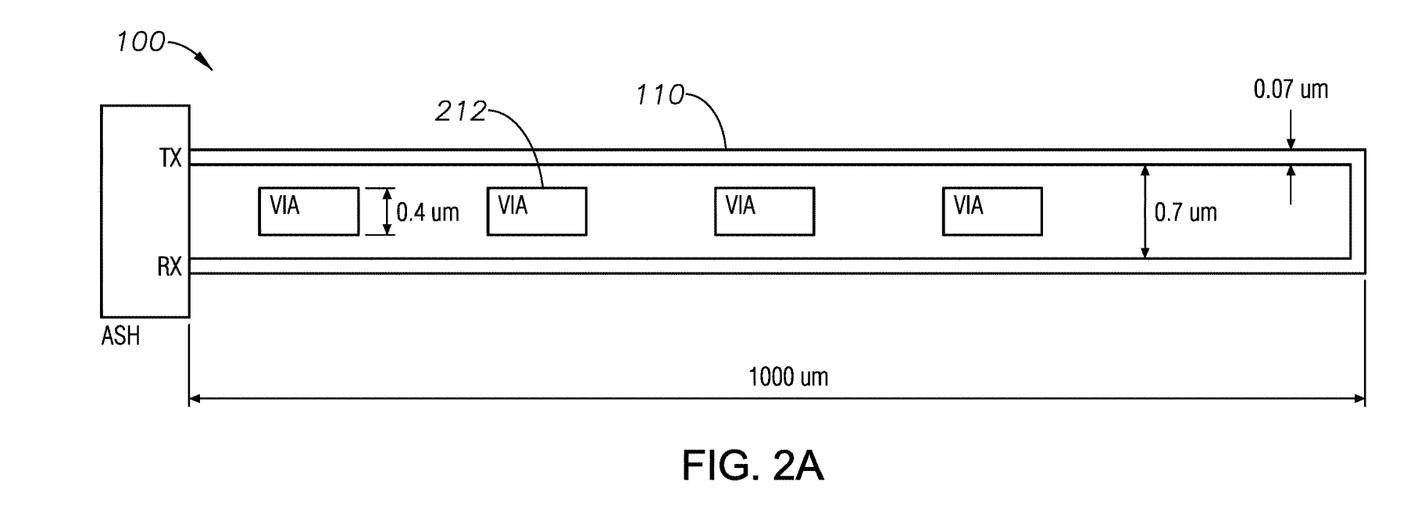
FIGS. 2A-2B are schematic diagrams in accordance with various implementations described herein.
Figure 2B:
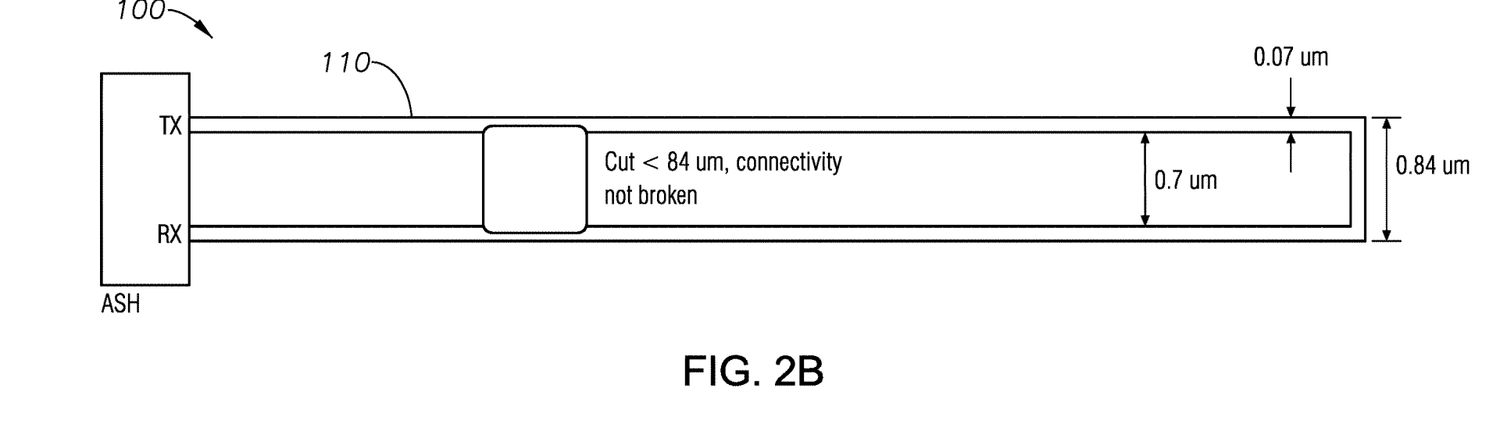

Referring to FIGS. 2A-2B, example top views of the circuit 100 (i.e., metal shield system) is shown according to example implementations. As illustrated, in certain examples, the metal shield system 100 (i.e., active shield system (ASH)) may be positioned on the M6 layer of an example, 8-layer stack, where all the signals of the one or more circuit devices 102 (i.e., sensitive IP) may be routed below the metal shield system 100. Also, as depicted in FIG. 2A, the metal shield system 100 can include gaps for the power/ground networks (PG nets, power/ground wires) (e.g., configured on the M7 and M8 metal layers above the M6 metal layer) (not shown) and vias 212 that connect upper and lower metal layers. Moreover, the power/ground wires and vias 212 would be positioned in-between each the transmission (TX) and the reception (RX) of each metal layer of the metal wires 110 as well as between separate metal wires 110. Accordingly, as an advantage, protection would be provided such that an attack would be restricted in making a direct connection without also shorting the power lines. Accordingly, for instance the two or more metal wires 110 (e.g., as can be configured on a first metal layer (e.g., M6), while the power and ground networks (PG nets) and the vias 212 can be configured on a second metal layer (e.g., M7, M8) (i.e., the first metal layer would be below the second metal layer). Also, as shown in FIGS. 2A-2B, power delivery would occur while maintaining minimum required spacing between the shield wires 110 (e.g., 0.7 um) to ensure that either a power ground via or a power ground route can be performed without causing any design rule violations (DRV).

Correspondingly, each of the wires 110 of the active shield system 100 may be dimensioned as approximately 1000 um across the length and 0.07 um width of each of the wires 110. Consequently, as there would be significant capacitance upon these wires 110, the system 100 would generate a greater amount of noise on the power lines and on the associated electromagnetic field. Advantageously, such an occurrence, would be beneficial to protecting against "side-channel" attacks that detect information or seek a leakage of information through power or electromagnetic (EM) traces. Also, as depicted in FIG. 2B, advantageously, based on the example dimensions of the shield 100 and the gaps, any cut above approximately 0.84 um would be detected (e.g., as there is 0.7 um spacing of the, shield 100 and the width of the TX and RX portion of each wire 110 is 0.07 um).

Correspondingly, as the system 100 would provide a significant amount of random noise, the system 100 can be altered to ensure that such noise is advantageous. Accordingly, the edges of the LFSR 130 clock may be matched with that of the circuit devices 102 (i.e., the sensitive IP) such that the noise may be "fired off" at similar times in the time domain. In doing so, if an attacker would be actively "listening" to the EM noises or power traces, the noise of the system 100 would degrade the attacker's signal-to-noise ratio (SNR).

As another feature, the system 100 has the capacity to turn off. In certain examples, due to the consumption of a high amount of dynamic power (due to the significant capacitance), the system 100 would require "bigger" standard cells (e.g., standard cells with larger transistor sizes, parallel transistors capable of driving large capacitances) (i.e., standard cells with a high drive strength) to drive each of shield wires 110. For instance, for an entire hard macro (i.e., security subsystem chip), the dynamic power of the system 100 may be operating at approximately 8% of the peak activity of the hard macro itself. Hence, to save power, the system 100 may be turned off (as the system 100 would not be required to be in operation while the hard macro is also in operation, and cannot be compromised). As such, the system 100 would include a control signal 138 (i.e., ash_en) to disable the shield 100, and ensure that the shift register (e.g., LFSR) 130 would not toggle (and thereby save power). Accordingly, the system 100 may be disabled if desired. In doing so, the gated clock signal 136 (i.e., ash_lfsr_gated_clk) may be provided to the shift register (e.g., LFSR) 130 to ensure that there an no further toggles on the two or more wires 110.

In addition, in certain cases, by utilizing a 16-bit LFSR, each bit of the 16-bits would have toggled at least once in 16 cycles. On average, each bit may toggle eight times, but it would be assured that each bit would toggle at least once over 16 cycles. As such, in certain implementations, a counter 350 may be provided to keep track of the number of clock cycles that have occurred after a re-activation of 16 cycles. Hence, a counter 350 (as described with reference to FIGS. 3 and 7) can generate a check_done signal 352 to determine whether a particular shield wire 110 has in fact been compared for a digital "1" value (and/or a digital "0" value in certain implementations) (as described with respect to FIGS. 3 and 7), as the bit would have toggled at least once.

Accordingly, in certain implementations, for example, if after 16 cycles and after the check done signal 352 may be asserted, and if there is no alarm, it may be understood that the system 100 has not been broken ("cut"). the system 100 may then decide to stop the system 100 and save power.

In terms of area utilization, the number of standard cells that may be required on the active shield 100 can in fact be low (e.g., 2500 cells for 1 mm$^2$ block). Accordingly, the shield 100 would not cover a significant portion of the standard cell area. Advantageously, the system 100 design may be optimized such that a designer can parametrize it (e.g., with respect to the design tool 1124 in FIG. 11), and provide a quantity establishing how many shield wires 110 each LFSR 130 can drive. Such a determination can be dependent on the size of a load, and therefore, further optimization can be made in utilizing a less quantity of registers on the LFSR 130 (i.e., one or more LFSRs) to cover an entire design (e.g., system 100). Also, in certain examples, a relatively small portion of the area on one edge of the semiconductor chip may be blocked off for related circuitry of the system 100. In certain implementations, the area of such circuitry would be 2-3% of an entire chip area.

Referring to FIG. 3, a tamper detection system 300 (i.e., tamper detection circuitry, active shield, macro system) according to example implementations is shown. As illustrated, the shield system 300 may include the shield system 100 (that corresponds to the shift register and comparator block (i.e., active shield (ASH) LFSR and comparator) 330). In one implementation, similar to FIG. 1, the tamper detection system 300 can include solely the shift register and comparator block 330. In such an implementation, the shift register and comparator block 330 can be configured to receive an enable or disable signal, two or more seed bit values (i.e., ash seed reg[15:0]), and a clock signal, and output a (raw) alarm signal. As may be appreciated, each of the features as described with respect to the system 100 may also be applied in various implementations as part of the system 300 of FIG. 3.

In certain other implementations, as illustrated in FIG. 3, the tamper detection system 300 can include, for example, on or more of: a (GSI) data input block 310; a clock gating block (i.e., clock register block; ASH LFSR clock gater) 320; the shift register and comparator block (i.e., ASH LFSR and comparator) 330; an alarm latch 340; a counter block (i.e., ASH counter) 350; a clock selection logic (i.e., clock select block, ASH clock select) 360; and a seed ready pulse logic block 370.

The data-in block (data input block) 310 (as described in greater detail with referenced to FIGS. 5A-5D) can be configured to receive externals signals including: an initial enable signal (ash_en_n) 301 (as described in greater detail with referenced to FIG. 5A); initial two or more seed signals (ash_seed [15:0]) 302 (i.e., pseudo-random bit values) (as described in greater detail with referenced to FIG. 5B); an initial seed ready signal (ash_seed_ready) 303 (as described in greater detail with referenced to FIG. 5C); an initial control signal (ash_control_[0]) 304 (as described in greater detail with referenced to FIG. 5D); a validity check signal (ash_data_valid) 305 (i.e., data valid signal); and a first clock signal 306 (ash_clock, an internal divided clock signal, primary clock signal) for the system 300. Also, the data-in block 310 may be configured to generate output signals of the data-in block 310 such as: an enable signal (ash_en_n_reg) 311 (as described in greater detail with referenced to FIG. 5A); a seed ready signal (ash_seed_ready_reg) 312 (as described in greater detail with referenced to FIG. 5C); two or more seed signals (e.g., ash_seed_reg [15:0]) 313 (as described in greater detail with referenced to FIG. 5B); and a clock selection bit (i.e., control signal) (ash_control_[0]_reg) 314 (as described in greater detail with referenced to FIG. 5D).

Similar to the enable signal 138 in FIG. 1, the enable signal 301 may either enable or disable the shift register 330. As the shift register 330 also receives the primary clock signal 306, the enable signal 301 may be configured to either allow or disallow toggling of the clock signal 306. For example, as the shift register 330 can be a LFSR, the current state of each of the outputs Q0-Q15 in a first cycle (e.g., for a 16-bit register) would depend on a prior state of each of the outputs Q0-Q15 in a preceding cycle, while the next state of the each of the outputs Q0-Q15 in a second cycle (e.g., for a 16-bit register) would depend the current state of each of the outputs Q0-Q15 of the first cycle. Accordingly, upon initialization of the system 300, the next state would be a function of a reset value.

In certain examples, similar to the seed input signal 132 (e.g., 132a-o) in FIG. 1, initially, prior to operation of the system 300, the seed input signals 302 (e.g., 302a-o) may be pseudo-randomly loaded to any 16 bit value (e.g., for a 16-bit register) to commence operation of the system 300.

In certain cases, similar to seed ready signal 134 in FIG. 1, the seed ready signal 303 may be an acknowledgement signal for each particular seed to verify that a seed input is from the 16 bits (e.g., for a 16-bit register), and therefore, is valid and can be utilized.

The control bit (i.e., clock selection bit, ash_control [0]) 304 can be included to provide a noise benefit of an active field. In certain cases, the control bit 304 can be utilized to select from two different clocks (e.g., either the primary clock signal 306 or a second clock signal 308) to run the LFSR 330.

The data valid signal 305 may be a validation bit to ensure that the circuit 300 "takes" the external bit values (e.g., the two or more seed signals) 313. For example, if the data valid signal 305 is held "low", it would indicate that the bit values would be unknown during a power up sequence or reset sequence. Instead, the signal 305 would be held high to ensure that correct values are available to be taken in as input to the circuitry 300.

In certain examples, the clock selection logic block 360 (as described in greater detail with reference to FIG. 6) can be configured (e.g., utilizing the clock selection bit 314) to select between the primary clock signal (ash_clock, active shield clock) 306 or the second clock signal (ash_cc312_clk) 308 that is configured to operate (i.e., run) the one or more circuit devices 102 (i.e., protected circuitry with reference to FIG. 1). In doing so, the system 300 may reduce side-channel leakage of the protected circuitry by having the option to run the system 300 on the same clock. Accordingly, the EM/power noise of the active shield 300 and the side channel leakage align in the time domain.

In certain cases, the clock gating block 320 can be configured to receive an enable signal (ash_en) 316 (i.e., the inverted signal of the (ash_en_n_reg) 311), and output a gated clock signal (ash_lfrs_gated_clock) 321 to the shift register and comparator block (i.e., ASH LFSR and comparator) 330.

The shift register and comparator block (i.e., ASH LFSR and comparator) 330 (as described in greater detail with reference to FIGS. 1 and FIG. 4) can be configured to receive the enable signal (ash_en) 316, the two or more seed signals (ash_seed_reg [15:0]) 313, and the gated clock signal (ash_lfsr_gated_clock) 321. In turn, the shift register and comparator block (i.e., ASH LFSR and comparator) 330 can be configured to output a raw alarm signal 322.

The counter block (i.e., ASH counter, counter register) 350 (as described in greater detail with reference to FIG. 7) can be configured to receive the enable signal (ash_en) 316, the seed ready pulse signal (ash_seed_ready_pulse) 372, and the gated clock signal (ash_lfsr_gated_clock) 321. In turn, the counter block 350 may output (i.e., generate) the check done signal (ash_check_done) 352. In certain implementations, the counter 350 may include a 16-cycle counter. The check done signal 352 can indicate that all wires of the circuit 300 have toggled at least once when the alarm signal (e.g., ash_alarm 342) corresponds to a digital "0" (e.g., "low"). (i.e., no detection of an attack has occurred).

In certain cases, the seed ready pulse logic block 370 (as described in greater detail with reference to FIG. 8) is configured to receive the seed ready signal (ash_seed_ready_reg) 312 provide the seed ready signal 312, and output the seed ready pulse signal (ash_seed_ready_pulse) 372 to the counter block 350 and the shift register comparator block 330.

In certain instances, the alarm latch block (i.e., alarm register) 340 (as described in greater detail with reference to FIG. 9) is configured to receive the raw alarm signal 332 from the shift register and comparator block 330 as well as an alarm clearing signal (ash_alarm_clear) 341, and the clock signal (ash_clk) 316. In turn, the alarm latch block 340 would output the alarm signal (ash_alarm) 342. For example, the alarm clearing signal 341 can be utilized as an extra bit if a designer/operator wanted to disable an alarm signal 342 during test. Additionally, each of the registers in FIG. 3 may also be reset using a dedicated reset signal (not shown).

In certain implementations, an external seed may be utilized "to feed" the LFSR (130, the shift register in 330). For example, this may be performed by combining a unique value per board (e.g., derived from a per chip value in the one time programming (OTP)) and a boot counter. This can ensure that on each manufactured part/device and on each subsequent boot, the seed utilized would be randomized.

In one instance, a particular seed may be fed externally to the register transfer level (RTL) that can implement the shield (100, 300) for the seed itself. For example, the seed may be fed to the LSFR (130, the shift register in 330) by running a hash of two separate signals: 1) a OTP value that is unique for every chip, and 2) a boot counter which is different for a chip every time the design (100, 300) would boot. Hence, a combination of the signals would ensure that the starting state of the circuit 100, 300 would be different across different chips and across different times of the same chip. With LSFR (130, the shift register in 330), by knowing a starting point, one can determine what the next state would be. The starting point of the LSFR (130, the shift register in 330) would be critical to determine the next state, and correspondingly, depending on the next state, there would be greater difficulty to go to the next state by bypassing the current state (because one would not know the starting state due to the randomness of the seed).

In addition, the system 100, 300 can provide for software activation control (as described with reference to FIG. 11) in that the shield 100, 300 can run during boot (when a first compare would occur), and then periodically. Also, the shield 100, 300 can run when an operator desires to generate noise to mask an operation elsewhere (e.g., the noise effect benefit of the LFSR). Software control of the shield 100, 300 may also be utilized to control enable/disable (i.e., start/stop) features of the shield 100, 300. For example, if the shield 100, 300 is not required at a particular time, it may be disabled to save power.

Referring to FIG. 4, an example shift register is shown according to example implementations. As illustrated, the shift register (e.g., shift register 130 in FIG. 1, and the shift register in shift register and comparator 330 in FIG. 3) is shown as a four-bit linear feedback shift register 400 (i.e., LFSR) (e.g., an LFSR shift register, an ASH LFSR block). However, in various other implementations, the shift register 100, 300 may be two-bit or larger register (e.g., two-bit, four-bit, 8-bit, 16-bit, 32-bit, etc.).

In certain implementations, the shift register (i.e., shift register circuitry) 400 can include two or more latches 420 (e.g., 420*a-d* for a 4-bit register (as illustrated), 420*a-o* for a 16-bit LFSR); respective multipliers 410 (e.g., 410*a-d*, 410*a-o*) for each latch 420; and a NOR gate 430. As shown, the shift register 400 has the following input signals: 1) separate "seed" input signals (ash_seed_reg[3:0] (i.e., two or more seed signals) (e.g., for a 4-bit register; ash_seed_reg [15:0] for a 16-bit register)) 313 (e.g., 313*a-d*, 313*a-o*); 2) a seed ready signal (ash_seed_ready_pulse) 372; and 3) an input gated clock signal (ash_lsfr_gated_clk) 321. Based on the input signals, the shift register 400 can output separate bits/signals Q0-Q3 (e.g., for a 4-bit LFSR) (e.g., Q0-15 for a 16-bit register).

As illustrated, a feedback loop is generated when certain register outputs (e.g., 420*a* and 420*b*) are combined though a combinational gate 430 (e.g., a NOR gate) and fed back as the input to the first register (e.g., 420*d*), and the input gated clock signal (ash_lsfr_gated_clk) 321 and the output of each respective multiplier 410 is provided to each latch 420 (e.g., 420*a-d*). Subsequently, output signals Q0-Q3 may be output from each respective latch 420. Based on the circuitry 400, the pseudo-random initial bit values may be generated where bits in subsequent and consecutive cycles are based on the bit values of the immediately preceding cycle.

Figure 5A:
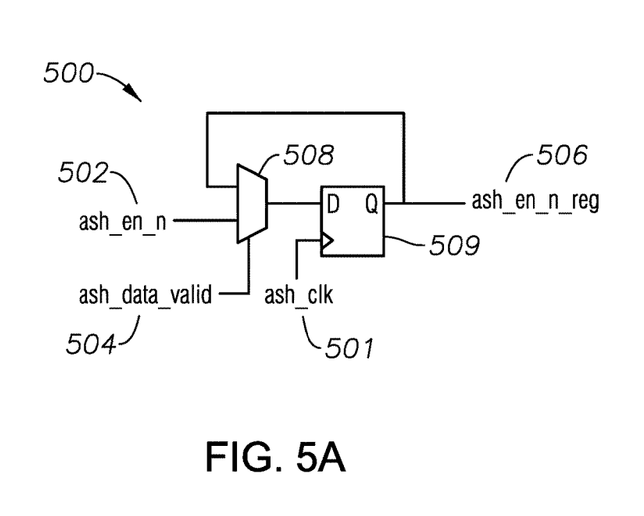
FIGS. 5A-5D are schematic diagrams of portions of example circuits in accordance with various implementations described herein.

Referring to FIGS. 5A-5D, example circuitry of the data-in block (data input block) 310 is shown. As illustrated in FIG. 5A, in a feedback loop, a multiplexer 508 can receive an initial enable signal (ash_en_n) 502 and an output signal of the latch 509, and based on a data validity signal 504 can transmit, from the latch 509 operating on the primary clock signal 501, a valid enable signal (ash_en_n_reg) 506.

Figure 5B:
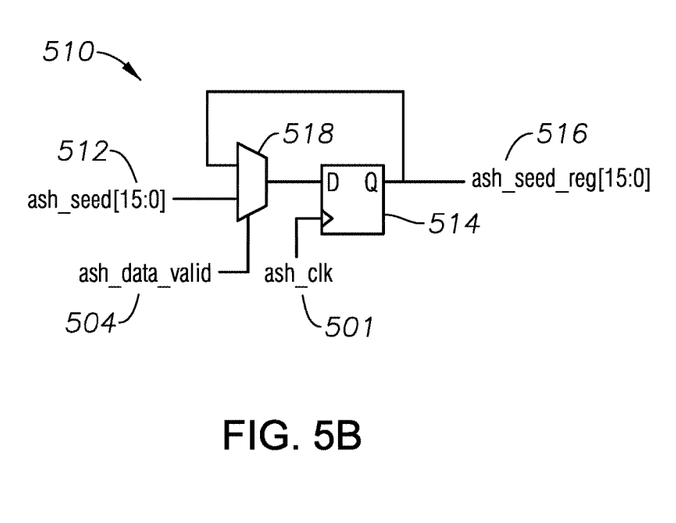

As illustrated in FIG. 5B, in a feedback loop, a multiplexer 518 can receive an initial seed signal (of the two or more seed signals) (ash_seed_reg [15:0]) 512 and an output signal of the latch 514, and based on a data validity signal 504 can transmit, from the latch 514 operating on the primary clock signal 501, a valid seed signal (ash_seed_reg [15:0]) 516.

Figure 5C:
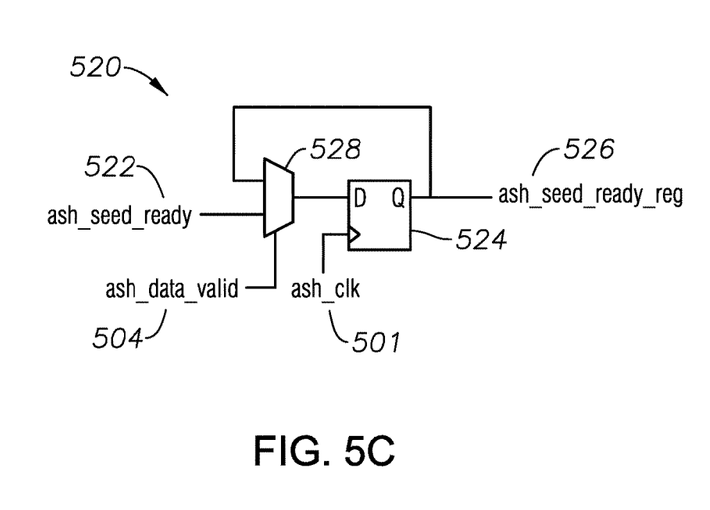

As illustrated in FIG. 5C, in a feedback loop, a multiplexer 528 can receive an initial seed ready signal (ash_seed_ready) 522 and an output signal of the latch 524 operating on the primary clock signal 501, and based on a data validity signal 504 can transmit, from the latch 524, a valid seed ready signal (ash_seed_ready) 526.

Figure 5D:
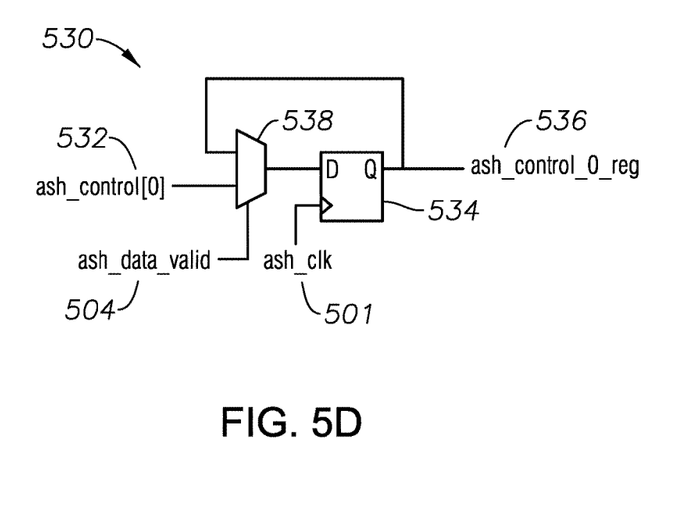

As illustrated in FIG. 5D, in a feedback loop, a multiplexer 538 can receive an initial control signal (ash_control_ [0]) 532 and an output signal of the latch 534, and based on a data validity signal 504 can transmit, from the latch 534 operating on the primary clock signal 501, a valid control signal (ash_control_[0]) 536.

Figure 6:
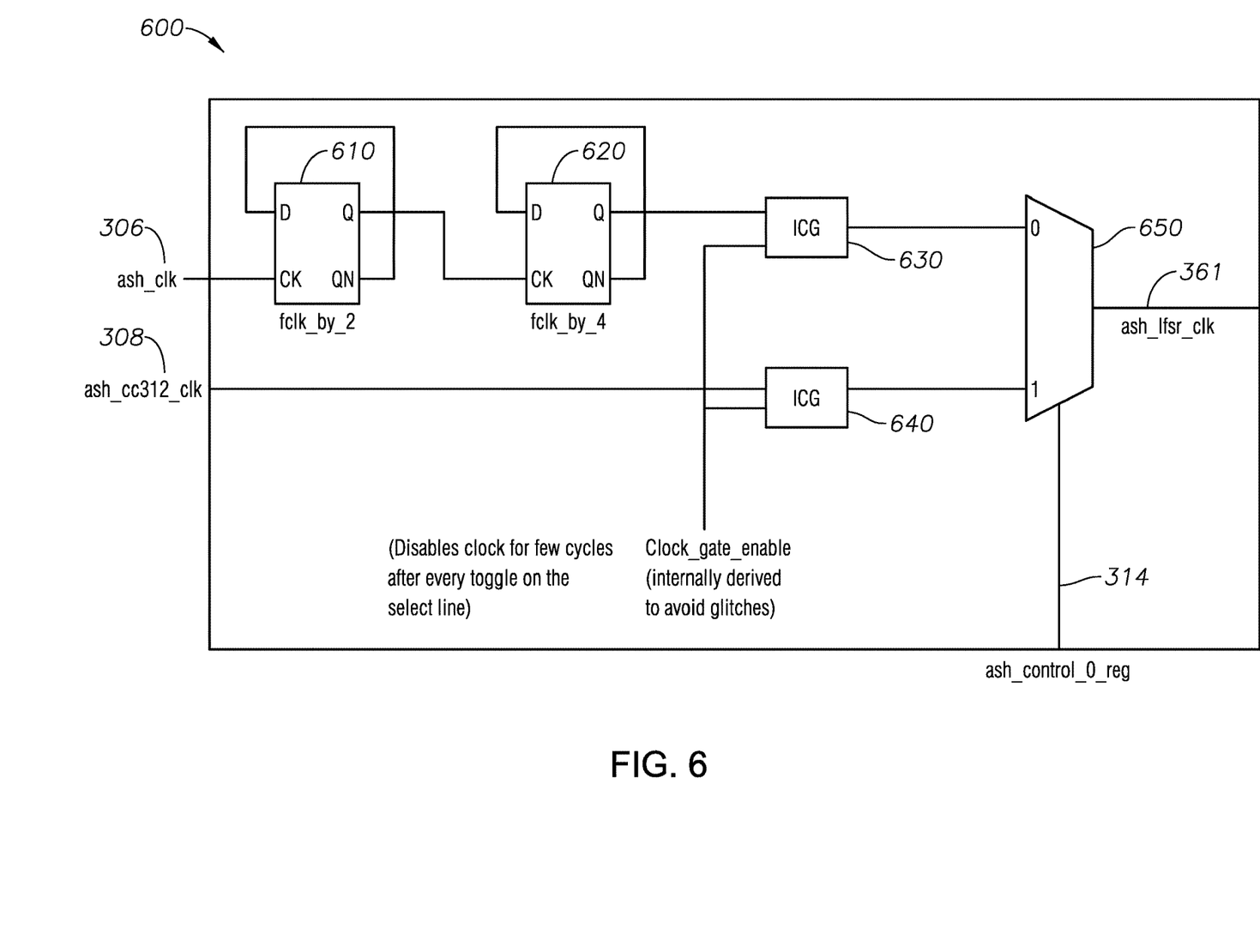
FIG. 6 is a schematic diagram of a portion of an example circuit in accordance with various implementations described herein.

Referring to FIG. 6, an example clock selection logic block 600 is shown according to example implementations. As illustrated, the clock selection logic block 600 corresponds to the clock selection logic block 360 (with reference to FIG. 3). The clock selection logic block 600 may include first and second latches 610 and 620, first and second clock gate enable blocks 630, 640 and a multiplexer 650. Advantageously, the first and second clock gate enable blocks 630, 640 are internally derived to avoid glitches. For example, the clock may be gated for four cycles every time the control signal (i.e., ash_control_0_reg) toggles to avoid glitches. The block 600 may also include input signals: the primary clock signal (ash_clock) 306, the second clock signal (ash_cc312_clk) 308, and the control signal (ash_control_0_reg) 314, and transmit an output clock signal (ash_lfsr_clk) 361.

Advantageously, the clock selection logic block 600 has the capacity (by the control signal 314) to select between the primary clock signal (ash_clock) 306 or a second clock signal (ash_cc312_clk) 308 that is configured to operate the one or more circuit devices 102 (i.e., protected circuitry (i.e., sensitive IP) with reference to FIG. 1). In doing so, the system 300 may reduce side-channel leakage of the protected circuitry by having the option to run the system 300 on the same clock. Accordingly, the EM/power noise of the active shield 300 and the side channel leakage align in the time domain.

Figure 7:
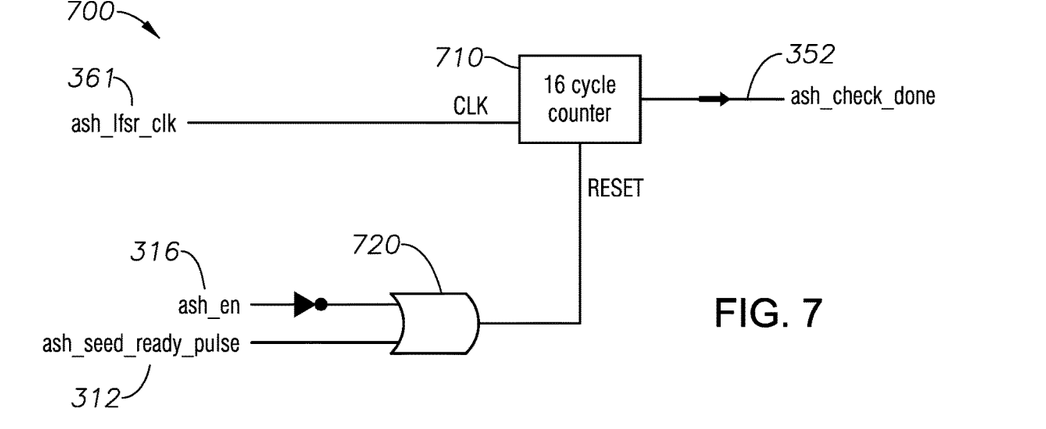
FIG. 7 is a schematic diagram of a portion of an example circuit in accordance with various implementations described herein.

Referring to FIG. 7, an example counter circuit block 700 is shown according to example implementations. As illustrated, the counter circuit block 700 may correspond to the counter circuit block 350 (with reference to FIG. 3). The counter circuit block 700 can include a 16-cycle counter 710 (e.g., corresponding to a 16-bit LFSR) that receives the shield clock signal (ash_lfsr_clock_signal) 361 and outputs the check done signal (ash_check_done) 352. Also, as shown, the enable signal (ash_en) 316 is inverted and compared with the seed ready pulse 312 at the OR gate 720. The output signal of the OR gate 720 would be a RESET signal to reset the counter 710.

As discussed, by utilizing a 16-bit LFSR, each bit of the 16-bits would have toggled at least once in 16 cycles. On average, each bit may toggle eight times, but it would be assured that each bit would toggle at least once over 16 cycles. As such, in certain implementations, a counter 710 may be provided to keep track of the number of clock cycles that have occurred after a re-activation after 16 cycles. Hence, the counter 710 can generate a check_done signal 352 to determine whether a particular shield wire 110 has in fact compared for both a digital "1" value and a digital "0" value, as the bit would have toggled at least once. Accordingly, in certain implementations, for example, if after 16 cycles and after the check done signal 352 may be asserted. If there is no alarm, it may be understood that the system 100, 300 has not been broken ("cut"). The system 100, 300 may then decide to stop the system 100, 300 and save power.

Figure 8:
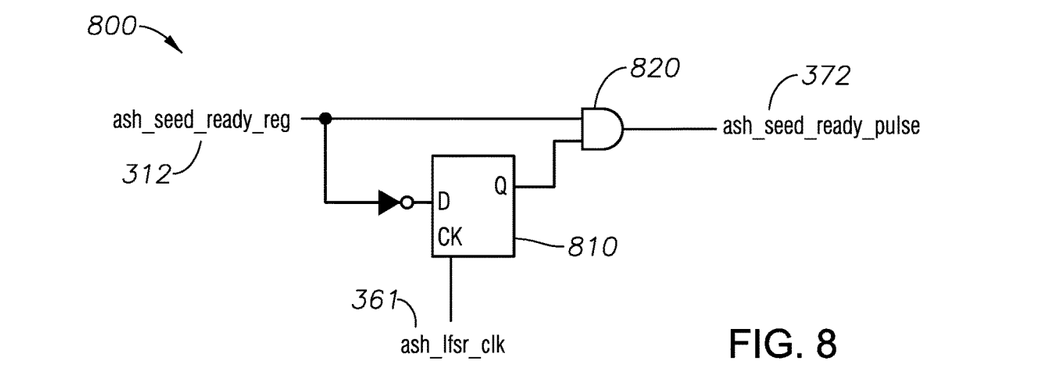
FIG. 8 is a schematic diagram of a portion of an example circuit in accordance with various implementations described herein.

Referring to FIG. 8, an example (active shield) seed ready pulse block (i.e., seed ready pulse register) 800 is shown according to example implementations. As illustrated, the seed ready pulse block 800 may correspond to the seed ready pulse block 370 (with reference to FIG. 3). The block 800 can include a latch 810 that receives an inverted seed ready signal (ash_seed_ready_reg) 312 as well the shield clock (ash_lfsr_clk) 361 to output a signal that inputs into an AND gate 820 along with the seed ready signal (ash_seed_ready_reg) 312. The output of the AND gate 820 is the (ash) seed ready pulse signal 372.

Figure 9:
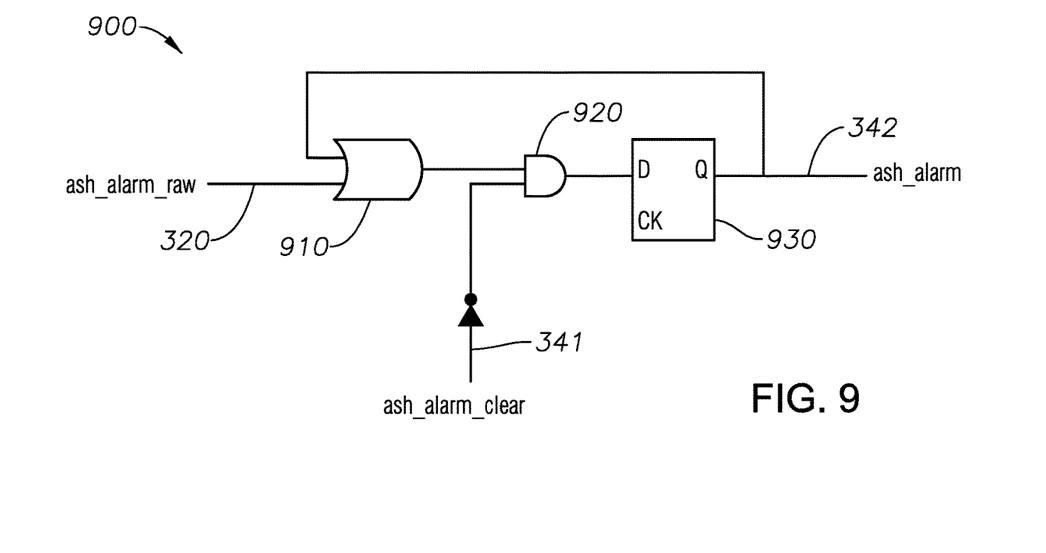
FIG. 9 is a schematic diagram of a portion of an example circuit in accordance with various implementations described herein.

Referring to FIG. 9, an example alarm block (i.e., alarm latch, alarm register) 900 is shown according to example implementations. As illustrated, the alarm block 900 may correspond to the alarm latch 340 (with reference to FIG. 3). The block 900 can include a OR gate 910 that receives the raw alarm signal 320 and an output of a latch 930 in a feedback loop to generate the alarm signal 342. Also, the latch 930 is configured to receive the output of an AND gate 920 that receives an inverted alarm clear signal 341 as well as the output of OR gate 910. Advantageously, the alarm block 900 can provide a continuous alarm signal based on the raw alarm signal 320 as well as the capability to clear the alarm signal.

Figure 10:
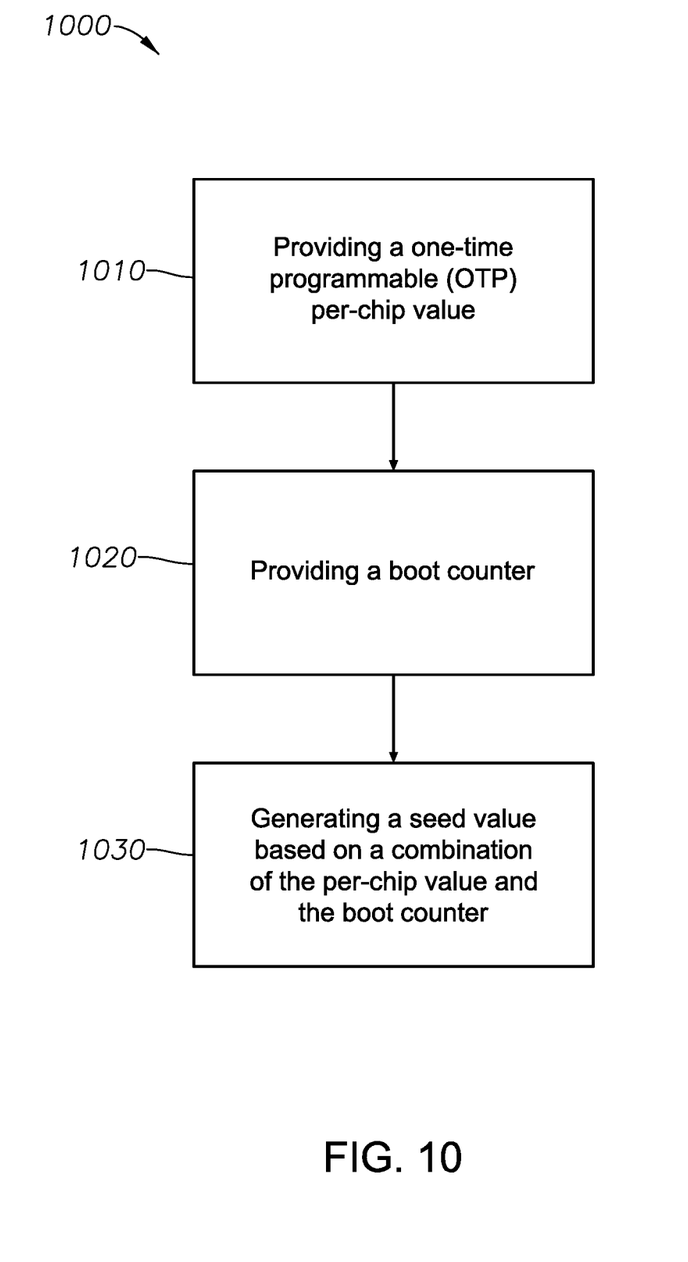
FIG. 10 is a method in accordance with various implementations described herein.

Referring to FIG. 10, a flowchart of an example method 1000 (i.e., procedure) to generate a unique seed for one or more shift registers (e.g., LFSRs) is shown. Advantageously, in various implementations, the method 1000 may be implemented with reference to circuit implementations and operations as depicted in FIGS. 1-9.

At block 1010, a one-time programmable (OTP) per-chip value may be provided during manufacturing phase of a semiconductor chip. At block 1020, a boot counter (that is firmware maintained) may be provided. At block 1030, a seed value based on a combination of the per-chip value and the boot counter may be generated. For example, a seed value may be fed to the LSFR (130, the shift register in 330) by running a hash of two separate signals: 1) a OTP value that is unique for every chip, and 2) a boot counter which is different for a chip every time the design (100, 300) would boot. Hence, a combination of the signals would ensure that the starting state of the circuit 100, 300 would be different across different chips and across different times of the same chip.

Figure 11:
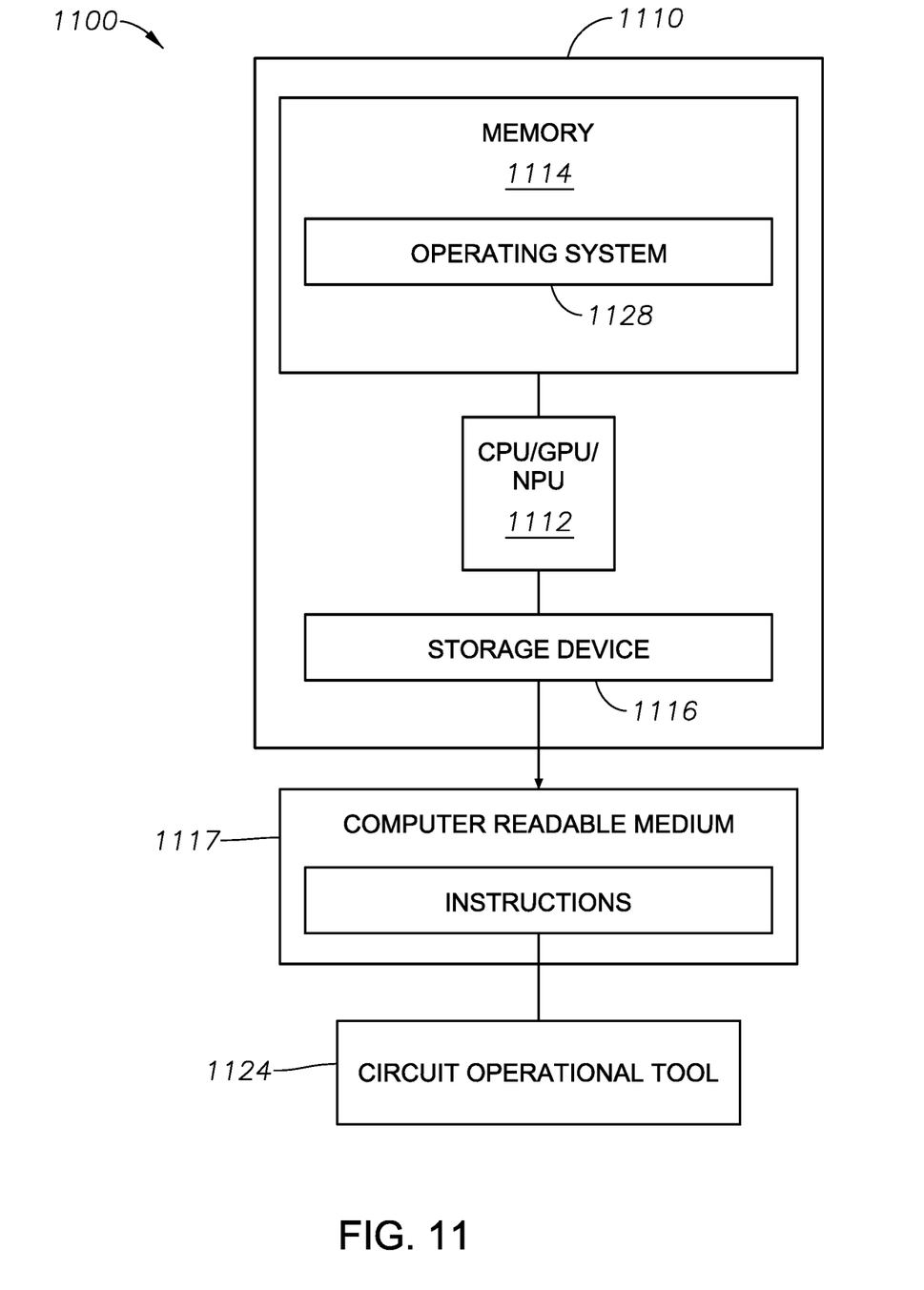
FIG. 11 is a block diagram in accordance with various implementations described herein.

FIG. 11 illustrates example hardware components in the computer system 1100 that may be used for software control of the shield 100, 300: for example: 1) to run during boot (when a first compare would occur), and then periodically; 2) when an operator desires to generate noise to mask an operation elsewhere (e.g., the noise effect benefit of the LFSR); and 3) control enable/disable (i.e., start/stop) features of the shield 100, 300. In certain implementations, the example computer system 1100 (e.g., networked computer system and/or server) may include an (active shield) circuit operational tool 1124 (e.g., seed generation tool) and execute software based on the procedure as described with reference to the method 1000 in FIG. 10 to generate seed signals.

Also, the procedure (as described with reference to FIG. 10) may be stored as program code as instructions 1117 in the computer readable medium of the storage device 1116 (or alternatively, in memory 1114) that may be executed by the computer 1110.

The system 1000 may perform the following functions automatically, with variable user input including: unique seed generation and activation control. In some instances, such functions may be performed substantially via user input control. Additionally, such functions can be used in conjunction with the manual capabilities of the system 1100 to produce the target results that are required by a designer.

In one implementation, the computer 1100 includes a central processing unit (CPU)/graphical processing unit (GPU)/neural processing unit (NPU) 1112 having at least one hardware-based processor coupled to a memory 1114. The memory 1114 may represent random access memory (RAM) devices of main storage of the computer 1110, supplemental levels of memory (e.g., cache memories, non-volatile or backup memories (e.g., programmable or flash memories)), read-only memories, or combinations thereof. In addition to the memory 1114, the computer system 1100 may include other memory located elsewhere in the computer 1110, such as cache memory in the CPU 1112, as well as any storage capacity used as a virtual memory (e.g., as stored on a storage device 1116 or on another computer coupled to the computer 1110).

The computer 1110 may operate under the control of an operating system 1126 and may execute or otherwise rely upon various computer software applications, components, programs, objects, modules, data structures, etc. (such as the programs associated with the procedure 1100 and the method 1000 and related software). The operating system 1128 may be stored in the memory 1014. Operating systems include, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 1126 in the example of FIG. 11 is shown in the memory 1114, but components of the aforementioned software may also, or in addition, be stored at non-volatile memory (e.g., on storage device 1116 (data storage) and/or the non-volatile memory (not shown).

In example implementations, circuit diagrams and representations have been provided in FIGS. 1-11, whose redundant description has not been duplicated in the related description of analogous circuit diagrams and representations. It is expressly incorporated that the same layout diagrams with identical symbols and/or reference numerals are included in each of embodiments based on its corresponding figure(s).

Although one or more of FIGS. 1-11 may illustrate systems, apparatuses, or methods according to the teachings of the disclosure, the disclosure is not limited to these illustrated systems, apparatuses, or methods. One or more functions or components of any of FIGS. 1-11 as illustrated or described herein may be combined with one or more other portions of another of FIGS. 1-11. Accordingly, no single implementation described herein should be construed as limiting and implementations of the disclosure may be suitably combined without departing form the teachings of the disclosure.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, an electronic storage device including, but not limited to, the following: a random access memory (RAM), a read-only memory (ROM), a one-time programmable memory (OTP), or any combination thereof.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A circuit comprising:
   two or more metal wires;
   respective XOR gates, wherein:
      each XOR gate is configured to compare a digital bit at a first portion of a respective wire of the two or more metal wires to a digital bit at a second portion of the respective wire;
   respective AND gates having outputs coupled directly to the respective XOR gates by way of the two or more metal wires;
   a linear feedback shift register (LFSR) having outputs coupled to inputs of the respective AND gates; and
   a latch configured to receive a combined signal of the XOR gates and transmit an output signal corresponding to an alarm signal.

2. The circuit of claim 1, wherein:
   the respective wire comprises a single shield wire;
   the first portion is located on a transmission end of the single shield wire;
   the second portion is located on a reception end of the single shield wire; and
   at least one of one or more vias or power and ground networks (PG nets) are configured in between the transmission end and the reception end of the single shield wire.

3. The circuit of claim 1, wherein:
   the LFSR comprises a two-bit register; and
   the LFSR is configured to drive respective signals of the two or more metal wires.

4. The circuit of claim 1, wherein:
   the first portion corresponds to a transmission signal of the respective wire of the two or more metal wires;
   the second portion corresponds to a reception signal of the respective wire of the two or more metal wires;
   the respective second portions of the two or more metal wires are solely configured around one or more circuit devices; and
   the two or more metal wires are routed along a metal layer and positioned to cover one or more signal wirings of the one or more circuit devices.

5. The circuit of claim 1, wherein at least one of the two or more wires comprise a different digital value during a particular timing cycle.

6. The circuit of claim 1, further comprising:
   an OR gate configured to receive each of the outputs of the XOR gates, combine the outputs of the XOR gates, and transmit the combined signal of the XOR gates to the latch.

7. The circuit of claim 6, wherein the latch is configured to store data corresponding to the output of the OR gate and generate a continuous signal corresponding to an alarm signal, and wherein the latch is configured to remove one or more errors caused by one or more propagation delays.

8. The circuit of claim 7, further comprising a counter configured to generate a first signal indicating that all wires of the circuit have toggled at least once if the alarm signal corresponds to a digital 0.

9. The circuit of claim 1, wherein the two or more metal wires are configured on a first metal layer, wherein at least one of power and ground networks (PG nets) and vias are configured on a second metal layer, and wherein the first metal layer is below the second metal layer.

10. The circuit of claim 9, wherein the first metal layer comprises openings configured for the PG nets and vias to couple between other metal layers above and below the first metal layer.

11. A system comprising:
    a shift register and comparator block configured to receive an enable or disable signal, two or more seed bit values, a clock signal, and output an alarm signal, wherein:
       the shift register and comparator block comprises XOR gates with respective first and second inputs coupled to respective first and second portions of a respective wire of two or more metal shield wires,
       the shift register and comparator block outputs the alarm signal by way of outputs of the XOR gates,
       the shift register and comparator block comprises a linear feedback shift register (LFSR) with outputs coupled to the XOR gates by way of AND gates and the two or more metal wires, and
       the AND gates have outputs coupled directly to the XOR gates by way of the two or more metal wires.

12. The system of claim 11, further comprising:
    a data-in block configured to provide an enable or disable signal and two or more seed bit values to the shift register and comparator block.

13. The system of claim 11, further comprising:
    a clock gating block configured to provide a clock signal to the shift register and comparator block.

14. The circuit of claim 11, wherein the shift register and comparator block is configured to transmit first signals corresponding to the two or more seed bit values and compare digital values of the first signals at respective first portions of the two or more metal wires to digital values of second signals at respective second portions of the two or more metal wires.

15. The system of claim 11, further comprising:
a seed ready pulse logic block configured to provide a seed ready signal to the shift register and comparator block.

16. The system of claim 11, further comprising:
a clock selection logic block configured to select between a primary clock signal of the shift register and comparator block or a second clock, wherein the second clock is configured to operate one or more protected circuitry.

17. The system of claim 11, further comprising:
a counter configured to generate a first signal indicating that all wires of the system have toggled at least once if the alarm signal corresponds to a digital 0.

18. The system of claim 11, further comprising:
an alarm latch configured to receive the alarm signal and an alarm clearing signal, and output a verified alarm signal.

19. A method comprising:
providing a one-time programmable (OTP) per-chip value;
providing a boot counter;
generating a unique seed value based on a combination of the per-chip value and the boot counter;
coupling outputs of a linear feedback shift register (LFSR) to XOR gates by way of AND gates and multiple respective metal shield wires, wherein each of the AND gates comprises an output coupled directly to first and second inputs of each of the XOR gates by way of the multiple respective metal shield wires;
applying the unique seed value to the shift register so as to drive respective signals to the XOR gates by way of the multiple respective metal shield wires; and
generating an alarm signal via outputs of the XOR gates based on the respective signals to the XOR gates.

* * * * *